United States Patent Office 3,652,525
Patented Mar. 28, 1972

3,652,525
METHOD FOR PRODUCING POLYVINYL-CHLORIDE PARTICLES
Akihide Nakamura, Iko Ito, and Mutuo Goto, Niihama-shi, Japan, assignors to Sumitomo Chemical Company, Ltd., Osaka, Japan
No Drawing. Filed June 17, 1968, Ser. No. 737,292
Int. Cl. C08f 1/13, 3/30, 47/20
U.S. Cl. 260—92.8 W    5 Claims

ABSTRACT OF THE DISCLOSURE

Vinyl chloride polymer having a composite structure in which the average polymerization degree of molecules constituting unit particles lowers from their respective central portions towards the circumferential portions is obtained by elevating the polymerization temperature or by adding a chain transfer agent to the polymerization system in the course of emulsion polymerization of vinyl chloride. Plastisol prepared from the vinyl chloride resin obtained by subjecting the polymer latex to spray drying has lower gelation temperature than that of a plastisol prepared from vinyl chloride polymer obtained according to usual processes, and is very useful for various uses such as coating, dipping and slush molding.

---

The present invention relates to polyvinylchloride resin having properties sulitable suitable for plastisol use and a method for producing the same.

Usually, vinyl chloride resin for plastisol use is produced by polymerizing vinyl chloride in an emulsion polymerization system by using seed polymer and/or by adding emulsifier incrementally during polymerization to get suitable unit particle size distribution and is followed by spray drying. The vinyl chloride polymer thus obtained is used as plastisol for various uses such as coating, dipping, slush molding, etc. In each of these uses, it is desired that the gelation temperature of the vinyl chloride resin is as low as possible.

It has been known that the gelation temperature of vinyl chloride resin for plastisol is lowered by lowering the average polymerization degree of vinyl chloride polymer or copolymerizing vinyl chloride with other monomer capable of being polymerized with vinyl chloride. However, when lowering the average polymerization degree of polymer, though its gelation temperature can be lowered to a certain extent, it is unavoidable that such mechanical properties as tensile strength, elongation, etc. of a shaped article obtained by using said polymer are degraded.

On the other hand, in the case of copolymer, for example, copolymer of vinyl chloride with vinyl acetate, the gelation temperature is lowered as the content of co-monomers is increased.

However, there are such defects such as the fact that the viscosity of the plastisol becomes remarkably high and the stability of viscosity and the thermal stability are degraded.

It has been known that the average polymerization degree of vinyl chloride polymer is dominated by polymerization temperature. Furthermore, it has also been well known that in polymerization of vinyl chloride, a polymer having a desired average polymerization degree can be obtained by effecting the polymerization at a given temperature predetermined therefor, and that in such polymerization the unit particles grow throughout the process of polymerization from their respective central portions towards circumferential portions.

Extensive studies have been carried out by the present inventors in order to obtain vinyl chloride polymer having properties suitable for plastisol which is capable of being gelled at a low temperature without sacrificing its mechanical properties, stability of viscosity and thermal stability.

As a result, it has been found that vinyl chloride polymer in the form of unit particles having a compostie structure in which the average polymerization degree of the molecules constituting unit particles lowers from their respective central portions towards the circumferential portions is capable of being gelled at a low temperature without sacrificing its mechanical properties, stability of viscosity and thermal stability, and said vinyl chloride polymer is superior to known vinyl chloride polymer for plastisols.

One object of the present invention is to provide vinyl chloride polymer having properties suitable for plastisols.

Another object is to provide a method for producing such vinyl chloride polymer.

Other objects will be apparent from the following descriptions.

In order to accomplish these objects, the present invention provides vinyl chloride polymer in the form of particles of 0.6–1.5 micron in an average diameter having a composite structure in which the average polymerization degree of the molecules of the unit particles lowers from their respective central portions towards the circumferential portions, and the average polymerization degree at the highest portion is 2000–3000, the average polymerization degree at the lowest portion is 500–1500, and the difference between the polymerization degrees at the highest portion and at the lowest portion is 700–2500.

Further the present invention provides a method for producing vinyl chloride polymer in the form of particles of 0.6–1.5 micron the average diameter having a composite structure in which the average polymerization degree of the molecules of the unit particles lowers from their respective central portions towards the circuferential portions, and the average polymerization degree at the highest portion is 2000–3000, the average polymerization degree at the lowest portion is 500–1500, and the difference between the polymerization degrees at the highest portion and at the lowest portion is 700–2500, by emulsion-polymerizing vinyl chloride in the presence of water, water-soluble catalyst used in the ordinary emulsion polymerization of vinyl chloride and emulsifier used in the ordinary emulsion polymerization of vinyl chloride, characterized in that (a) the polymerization is initiated at a temperature within a range of from 30° to 45° C., and when the conversion of polymerization reaches within a range of from 0 to 70%, preferably from 30 to 70%, based on the weight of charged monomer, the polymerization temperature is elevated by a temperature within a range of from 10° to 40° C. intermittently or continuously to a temperature of from 50° to 70° C., or (b) The polymerization is carried out at a temperature within a range of from 30° C. to 70° C., and, when the conversion of polymerization reaches within a range of from 30 to 70% based on the weight of charged monomer, a chain transfer agent is added to the polymerization system.

In the method for producing vinyl chloride polymer according to the present invention, in the case where the polymerization temperature is elevated in the course of the polymerization, it is necessary that the difference between the polymerization temperatures at the low and high sides is 10° C. or more, preferably 20° to 40° C. When the difference between the polymerization temperatures at the low and high sides is less than 10° C., the lowering effect on gelation temperature becomes extremely small. In the case of elevating the polymerization temperature, the lowering effect on gelation temperature can be attained by effecting temperature control on the point where the conversion of polymerization is within a range of from 0 to 70%, preferably from 30 to 70%, based on the weight of charged monomer. The elevation of temperature may be effected either in an intermittent or continuous manner.

The rate of elevation of polymerization temperature is not aobsolutely decided, but it is determined by effecting preliminary experiments, because polymerization time varies depending upon the catalyst employed, polymerization temperature, etc.

In the present invention, on the other hand, in the case where a chain transfer agent is used, it is possible to use, as the chain transfer agent, any compound having a chain transfer function in the polymerization of vinyl chloride such as a halogen substituted saturated or unsaturated hydrocarbon having 1 to 2 carbon atoms, or aliphatic mercaptans having 8 to 18 carbon atoms. Examples of these are trichloroethylene, perchloroethylene, dichloroethylene, tetrachloromethane and dodecyl mercaptan.

The amount of chain transfer agent added varies depending upon the kind, the timing of the addition of chain transfer agent and the desired difference of the average polymerization degree between the high and low polymerization portions in the respective unit particles. However, it may be determined by effecting preliminary experiments and should not exceed 10% based on the total weight of vinyl chloride because the presence of too much chain transfer agent retards the rate of polymerization and reduces the mechanical stability of latices. In addition, the practical purpose of this invention is attained by adding less than 10% of an effective chain transfer agent.

For example, if polymerization is carried out at a temperature of 45° C. and a chain transfer agent, trichloroethylene, is added in an amount of 3% based on the weight of vinyl chloride remaining in the polymerization system at the time when the conversion of polymerization is 60% based on the weight of charged monomer, a vinyl chloride polymer having a composite structure can be obtained in which the average polymerization degree of the molecules of the central portion of the unit particles is 2000 and that of the molecules of the surface layer portion of unit particles is 900.

In the present invention the average diameter of unit particles of the polymer is 0.6 to 1.5 micron and this can be controlled by conventionally known methods, for example, by the amount of seed used and the method of fractional addition of emulsifier.

In the process of the present invention, such catalysts as are usually used in the emulsion polymerization of vinyl chloride can be used. Furthermore, after-treatment subsequent to completion of the polymerization is also effected according to usual methods. That is, the catalyst used in the performance of the present invention may be any of water-soluble catalyst systems used in the ordinary emulsion polymerization of vinyl chloride. For example, there may be used potassium persulfate, ammonium persulfate or hydrogen peroxide alone, or redox catalyst system in which said persulfate or peroxide is combined with an organic to inorganic reducing agent.

Furthermore, as the emulsifier used in the process of the present invention, any of those emulsifiers used in the ordinary emulsion polymerization of vinyl chloride may be used. For example, such anionic surface active agent as sodium alkylsulfate, sodium alkylaryl sulfonate or salts of fatty acid may be used. Examples of these are sodium dodecylsulfate, sodium dodecylbenzene sulfonate, sodium stearate, sodium laurate, ammonium laurate, potassium palmitate, sodium myristate, di-(2-ethylhexyl) sodium sulfosuccinate and dibutyl sodium sulfosuccinate.

In the present invention, emulsion polymerization of vinyl chloride is carried out, for example, as follows.

POLYMERIZATION PROCESS

In a 100 l. glass-lined autoclave, 40 g. of demineralized water and vinyl chloride seed polymer latex having a uniform particle size of 0.3 micron in diameter and 1300 in average polymerization degree is charged. Then, the autoclave is closed and is bubbled with nitrogen introduced from an inlet installed at the bottom of the autoclave under reduced pressure in order to remove oxygen dissolved in water. Thereafter, the autoclave is evaculated until the pressure in its reaches about 15 mm. Hg absolute and 34 kg. of vinyl chloride monomer is introduced thereto.

On the other hand, hydrogen peroxide aqueous solution and rongalit (sodium-formaldehyde sulfoxylate) and sodium dodecyl sulfate mixed aqueous solution are prepared in separate tanks respectively. They are also bubbled with nitrogen to remove oxygen dissolved prior to addition to the polymerization system.

The reactant is heated to the fiixed temperature of polymerization by circulating hot water in the jacket of the autoclave under stirring with an agitator at 100 r.p.m.

From the time when the temperature reaches the fixed point to the end of polymerization, hydrogen peroxide solution is added at a constant rate by using a plunger pump. The whole amount of hydrogen peroxide used in a run comes to about 0.003–0.004% based on the weight of vinyl chloride monomer.

Furthermore, from the time at which the conversion reaches 13.5% based on the weight of vinyl chloride monomer to the end of the polymerization, the mixed aqueous solution of rongalit and sodium dodecyl sulfate is added by using another plunger pump at a constant rate through a separate introducing pipe from the one introducing hydrogen peroxide solution.

The time to start the addition of the later solution is decided by measuring the density of latex since the relation of the density of latex and the concentration of latex is predetermined.

Rongalit added throughout polymerization amounts to about 1.0 equivalent mole based on the moles of hydrogen peroxide.

The sodium dodecyl sulfate constitutes a total of 0.2–0.3% based on the weight of vinyl chloride monomer.

In usual polymerization processes, the temperature of the reactants is kept at a given temperature during the whole course of polymerization. However, in the present invention, the temperature is changed in the manner described in the disclosure. Alternatively a chain transfer agent is added as also described in the disclosure, while the temperature is kept constantly in order to make the composite structure of the unit particles.

The polymerization is suspended at a point where the pressure in the autoclave is at 1.0 kg./cm.$^2$ less than the saturated vapor pressure of vinyl chloride monomer at that temperature.

Unreacted vinyl chloride monomer is vented after the stirring is stopped. The time of polymerization is about 8 to 12 hrs.

It is also possible that 25 to 30% based on the sum of rongalit is charged in initially, i.e. prior to the close of the autoclave to hurry the initial rate of polymerization.

DRYING PROCESS

Vinyl chloride polymer thus obtained has a unit particle size in a range of 1.5 to 0.6 micron in average diameter.

Some emulsifiers, so called post polymerization additives are added to the latex. One of them produces reinforcing of the mechanical stability of the latex to such extent that the latex withstands transfer and spray drying. Others have the function of reducing the viscosity of plastisol prepared by using this polymer.

Thereafter, the latex is dried in a spray dryer to obtain dried powder, of 100 to a few microns in diameter, which is followed by grinding.

The process mentioned above is a usual process to dry polyvinylchloride for plastisol use. The polymer obtained in accordance with the present invention is also treated by usual process.

Vinyl chloride polymer obtained by the present invention has a composite structure in which the average polymerization degree of the molecule constituting the unit particles decreases from particle central portions towards the circumferential portions, and the average polymerization degree at the highest portion is 2000–3000, the average polymerization degree at the lowest portion is 500–1500, and the difference between the average polymerization degrees at the highest and at the lowest is 700–2500.

The resin thus obtained is made into a plastisol by mixing with 40–100% of plasticizer based on the weight of the resin and is used for coating, dipping and slush molding etc.

Thus, it has now become possible in accordance with the present invention to obtain a vinyl chloride polymer superior to an ordinary vinyl chloride polymer in properties so as to lower the gelation temperature of resin for plastisol without sacrificing its mechanical properties, stability of viscosity and thermal stability.

For example, 100 parts of the vinyl chloride polymer obtained according to the present process and 100 parts of a vinyl chloride resin for plastisol produced by an ordinary process are mixed respectively with 60 weight parts of dioctyl phthalate and 2 weight parts of Mark BB (a plasticizer produced by Adeca Argus Chemical Company) to obtain the respective plastisol. Gelation temperatures of these plastisol are determined by the three minutes hot bench method to show that the gelation temperature of the former is lower by 3°–12° C. than that of the latter.

Furthermore, the shaped articles obtained by using the vinyl chloride polymer of this invention show the same degree of mechanical properties, stability of viscosity and thermal stability as those of vinyl chloride resin for plastisol produced by conventional process.

The following examples are given to illustrate the present invention, but it should be understood that these examples are not given as limitative but illustrative, and therefore the present invention is not limited only to them.

The average polymerization degree referred to in the present invention is calculated as follows:

0.4 g. of a polymer is dissolved in 100 ml. of nitrobenzene, an insoluble portion, if any, is filtered and the specific viscosity of the soluble portion is measured and is introduced into the following equation:

Average polymerization degree $\bar{P}=500 \left( \text{antilog } e \frac{[\eta]}{0.168} -1 \right)$ wherein $[\eta]$ represents an intrinsic viscosity and is calculated by the equation:

$$[\eta]=\sqrt{\frac{2}{C}} \cdot \sqrt{\eta_{sp} - \log e\eta_{rel}}$$

in which $\eta_{sp}$=specific viscosity
$\eta_{rel}=(\eta_{sp}+1$: relative viscosity and
C=concentration (g./l. of the soluble portion of the polymer A gelation temperature can be determined for deairated plastisol prepared by mixing 100 parts of the obtained polymer 60 weight parts of dioctyl phthalate and 2 weight parts of Mark BB. As to a paste, a value as measured according to three minutes hot bench method is shown.

EXAMPLE 1

Into a 100 l. glass lined autoclave, were charged 40 kg. of demineralized water and 1.58 kg. of vinyl chloride seed polymer latex as a polymer having unit particles of uniform diameter of 0.3 micron and having an average polymerization degree of 1300, and then the autoclave was closed and bubbled with nitrogen under reduced pressure. Thereafter, 34 kg. of vinyl chloride monomer was introduced thereto and polymerization was initiated by elevating temperature. From the time when the temperature was elevated to the fixed degree, 0.0038 weight percent based on the vinyl chloride monomer of hydrogen peroxide and 1.0 equivalent mole of rongalite in the total amount based on the hydrogen peroxide were thereto added respectively through separate inlets throughout the whole polymerization time continuously at a constant rate, respectively. Further, from the time at which the constant rate, respectively. Further, from the time at which the conversion of polymerization reached 13.5 percent until the polymerization was completed, sodium dodecysulfate as an emulsifier was thereto added continuously in a proportion of 0.02 percent per hour based on the vinyl chloride monomer. The polymerization was suspended when the polymerization pressure was lowered by 1 kg./cm.² then the saturated vapor pressure of the vinyl chloride at that temperature, and unreacted monomers were recovered therefrom. Polymerization was repeatedly carried out under the exactly same conditions as in the polymerization as prescribed above except that various polymerization temperatures were employed as denoted in Table 1, to obtain polymer latices. Average polymerization degrees and average diameters of unit particles of the thus obtained polymer latices, and gelation temperatures of plastisol resins respectively obtained by spray drying said polymer latices are shown in Table 1.

TABLE 1

| No. | Polymerization temperature (° C.) Initial | Polymerization temperature (° C.) Later | Conversion at the point where polymerization temperature varied (percent) | Total conversion of polymerization (percent) | Average diameter of unit particle (μ) | Average polymerization degree | Gelation temperature (° C.) |
|---|---|---|---|---|---|---|---|
| 1 | 48 | (¹) | ---- | 83 | 0.9 | 1,800 | 81 |
| 2 | 60 | (¹) | ---- | 86 | 0.9 | 1,000 | 75 |
| 3 | 43 | 53 | 40 | 81 | 0.9 | 1,830 | 76 |
| 4 | 45 | 65 | 60 | 85 | 0.9 | 1,890 | 74 |
| 5 | 53 | 43 | 40 | 79 | 0.9 | 1,920 | 84 |
| 6 | 48 | 53 | 40 | 80 | 0.9 | 1,650 | 78 |
| 7 | 45 | 65 | 75 | 80 | 0.9 | 1,860 | 81 |

¹ Not varied.

In Table 1, No. 1 and No. 2 show the polymerizations which were carried out respectively at constant temperatures (without changing the temperature in the course of polymerization) and No. 3–No. 7 demonstrate the polymerizations carried out respectively by changing polymerization temperatures intermittently during polymerization so as to provide composite structures with the respective vinyl chloride polymers to be obtained. That is, in Nos. 3, 4, 6 and 7, polymers having low polymerization degree were respectively formed on the outer portions of unit particles, and those having high polymerization degree in the inner portion, whereas in No. 5 they were reversed.

As is clear from Table 1, in Nos. 3, 4 and 6 carried out in accordance with the present process, the gelation temperature can be lowered without lowering the average polymerization degrees, respectively.

However, in Nos. 6 and 7 although the polymerization temperatures were respectively elevated in the same way as in the present process, the lowering effect of gelation temperature is small in the case of No. 6 because of the small difference as small as 5° C. between the low and high temperatures employed for polymerization. Furthermore, a lowering effect of gelation temperature is small in the case of No. 7 because of a belated timing for varying polymerization temperature.

Still further, in the case of conventional process, i.e. in the case of No. 1 wherein a polymer having an average polymerization degree equivalent to those of Nos. 3 and 4 was obtained, the gelation temperature of No. 1 is remarkably high, compared with those of Nos. 3 and 4.

On the other hand, in the case of No. 2 where a polymer was obtained having a gelation temperature equivalent to those of Nos. 3 and 4 without varying polymerization temperature during the process of polymerization, its average polymerization degree is about 1000. In this way, it is apparent that a polymer having a low average polymerization degree is poor in mechanical properties, compared with the polymers having average polymerization degree of 1800–1900 as in the case of Nos. 3 and 4.

Further, as is clear from Table 1 as well, the gelation temperature inversely become high in the case of No. 5 where polymers having a low polymerization degree were formed in the inner portion of the unit particles and those having a high polymerization degree on the outer portion.

EXAMPLE 2

Into a 100 l. glass lined autoclave, were charged 40 kg. of demineralized water and 1.58 kg. of vinyl chloride seed polymer latex as a polymer having a uniform average diameter of the unit particles and having an average polymerization degree of 1300, and then the autoclave was closed and was bubbled with nitrogen under reduced pressure. Thereafter, 34 kg. of vinyl chloride monomer was thereto added and polymerization was initiated by elevating temperature. From the time when the temperature elevated to the fixed temperature, 0.0038 weight percent based on the vinyl chloride monomer of hydrogen peroxide and 1.0 equivalent mol of Rongalit in the total amount based on the hydrogen peroxide were respectively added through separate inlets continuously at a constant rate throughout the whole polymerization time.

Further, from the time at which the conversion of polymerization reached 13.5% until the polymerization was completed, sodium dodecylsulfate as an emulsifier was thereto added continuously in a proportion of 0.02 weight percent per hour based on the vinyl chloride monomer. At the point where the polymerization pressure was at 1 kg./cm.$^2$ less than the saturated vapor pressure of the vinyl chloride at that temperature, unreacted monomers were recovered. Furthermore, polymerization was carried out while continuously changing temperature so that the initial polymerization temperature was the lowest at 35° C. and the temperature at the end of the polymerization was the highest at 65° C. On the other hand, polymerization was carried out in the exact same manner as above except that the polymerization temperature was always maintained at 50° C. Average polymerization degrees, average diameter of the unit particles and gelation temperatures of the respective polymers obtained according to both polymerizations mentioned above are shown in Table 2.

TABLE 2

| No. | Polymerization temperature | Average polymerization degree | Average diameter of unit particle ($\mu$) | Gelation temperature (° C.) |
|---|---|---|---|---|
| 1 | Continuously varied from 35° C. up to 65° C. | 1,570 | 0.9 | 73 |
| 2 | 50° C. constant | 1,550 | 0.7 | 80 |

From Table 2, it is apparent that the gelation temperature of the polymer obtained in No. 1 where the polymerization temperature was controlled to increase it with an increase of conversion is quite low, compared with that of polymer of No. 2 obtained according to an ordinary method because the average polymerization degree was lowered as it came near the surface of the unit particles in polymer of No. 1.

EXAMPLE 3

Into a 100 l. glass lined autoclave, were charged 43 kg. of demineralized water, 0.0003 weight percent of sodium dodecylsulfate based on the vinyl chloride monomer, 0.1 weight percent of hydrogen peroxide based on the vinyl chloride monomer, and ⅙ equivalent mole based on the mole of hydrogen peroxide of sodium dihydrogen phosphate and then the autoclave was closed and was flushed with nitrogen under reduced pressure. Thereafter, 30 kg. of vinyl chloride monomer was introduced thereto. Polymerization was initiated by elevating to 48° C. From the time at which the conversion reached 14%, sodium dodecylsulfate in a proportion of 0.002 weight percent per hour based on the vinyl chloride monomer was continuously supplied thereto. Further, from the time at which the conversion reached 25%, a proportion of the sodium dodecylsulfate was varied to 0.03 weight percent per hour based on the vinyl chloride monomer and the supply thereof was continuously effected. Furthermore, ⅙ equivalent mole based on the hydrogen peroxide of sodium dihydrogen phosphate was added at the time with mixing in the sodium dodecylsulfate was added. At the time when the conversion reach 45%, the polymerization temperature was elevated to 60° C. to effect the polymerization. At the point where polymerization pressure was at 1 kg./cm.$^2$ less than the saturated vapor pressure of the vinyl chloride at that temperature, unreacted monomers were recovered.

For comparison sake, polymerization was carried out in the substantially same manner as above except that the polymerization temperature was always maintained at 53° C. Average polymerization degrees, average diameters of the unit particles and gelation temperatures of the respective polymers obtained by both polymerization methods mentioned above are shown in Table 3.

| No. | Polymerization temperature (° C.) Initial | Polymerization temperature (° C.) Later | Conversion at the point where polymerization temperature varied (percent) | Total conversion (percent) | Average diameter of unit particles ($\mu$) | Average polymerization degree | Gelation temperature (° C.) |
|---|---|---|---|---|---|---|---|
| 1 | 48 | 60 | 45 | 82 | 0.8 | 1,340 | 69 |
| 2 | 53 | ($^1$) | | 81 | 0.8 | 1,330 | 73 |

$^1$ Constant.

EXAMPLE 4

Into a 100 l. glass lined autoclave, were charged 40 kg. of demineralized water and vinyl chloride seed polymer latex having uniform unit particle size of 0.3 micron in diameter and average polymerization degree of 1300, said latex amounting to 1.5 kg. as a polymer.

Thereafter, the autoclave was flushed with nitrogen under reduced pressure, charged with 34 kg. of vinyl chloride monomer and the temperature was elevated to 45° C. to initiate polymerization. From the time when the temperature reaches to 45° C. 0.0038 weight percent based on the vinyl chloride monomer of hydrogen peroxide, and 1.0 equimolar based on the hydrogen peroxide of Rongalit were added thereto continuously throughout the polymerization time through separate inlets, respectively. Furthermore, from the time when the conversion reached 13.5 weight percent till completion of the polymerization, sodium dodecylsulfate as an emulsifier was thereto added continuously in a proportion of 0.02 weight percent per hour based on the vinyl chloride monomer. Further, 3 weight percent based on the vinyl chloride monomer remaining in the system at that time of trichloroethylene, i.e. a chain transfer agent was thereto added at a time. After the polymerization pressure was at 0.5 kg./cm.$^2$ less than the saturated vapor pressure of the vinyl chloride at 45° C., the polymerization was suspended to recover unreacted monomer therefrom. Furthermore, for the purpose of investigating the effect of the time of adding the chain transfer agent, the polymerization was carried out repeatedly by changing the time of adding the chain transfer agent, as shown in Table 4. The timing of addition of trichloroethylene, polymerization time, average polymerization degree, average diameter of unit particles, and gelation temperature of resins for plastisol which have been obtained by subjecting the individual polymer latices to spray drying are shown in Table 4.

the polymers thus obtained and gelation temperature of the resins for plastisol which were obtained by subjecting the individual polymer latices to spray drying are as shown in Table 5.

TABLE 5

| No. | Polymerization temperature (° C.) | Rate of polymerization before addition of trichloroethylene (percent) | Amount of trichloroethylene added (wt. percent) | Average polymerization degree | Average diameter of unit particles (μ) | Gelation temperature (° C.) |
|---|---|---|---|---|---|---|
| 1 | 45 | 60 | 1 | 1,930 | 0.8 | 81 |
| 2 | 45 | 60 | 3 | 1,700 | 0.8 | 76 |
| 3 | 45 | 60 | 5 | 1,490 | 0.8 | 73 |

As is clear from Table 5, it has been found that No. 1 is not suitable for pratical use in view of the small lowering effect on gelation temperature because the difference in polymerization degree between the inner and outer portions is 700 or less owing to the small amount of the chain transfer agent added, compared with the cases of No. 2 and No. 3 where the difference in polymerization degree between the inner and outer portions is 700 or more.

EXAMPLE 6

The following experiments were carried out to compare gelation temperatures of No. 2 and No. 3 polymers obtained in Example 5 with those of polymers having almost the same polymerization degree which were obtained by an ordinary polymerization process in which the polymerization degree is controlled by means of polymerization temperature.

Into a 100 l. glass lined autoclave, were added 40 kg. of demineralized water, vinyl chloride seed polymer latex having uniform unit particle size of 0.3 micron in diameter and average polymerization degree of 1300, said latex amounting to 1.5 kg. as a polymer, and 34 kg. of

TABLE 4

| No. | Polymerization temperature (° C.) | Conversion before addition of trichloroethylene (percent) | Amount of trichloroethylene added (wt. percent) | Polymerization time (hrs.) | Average polymerization degree | Average diameter of unit particles (μ) | Gelation temperature (° C.) |
|---|---|---|---|---|---|---|---|
| 1 | 45 | 0 | 3 | ¹12.0 | 950 | 0.8 | 69 |
| 2 | 45 | 10 | 3 | ¹12.0 | 1,330 | 0.8 | 73 |
| 3 | 45 | 30 | 3 | 8.3 | 1,610 | 0.8 | 74 |
| 4 | 45 | 70 | 3 | 8.0 | 1,780 | 0.8 | 76 |
| 5 | 45 | 80 | 3 | 8.0 | 1,920 | 0.8 | 81 |
| 6 | 45 | | | 7.8 | 2,200 | 0.8 | 83 |

¹ Interrupted.

As is clear from Table 4, the amounts of trichloroethylene added become very large in No. 1 and No. 2 because the timing of addition of trichloroethylene is too early in both cases, and for this reason, the rate of the polymerization becomes slow and mechanical stability of the latex becomes poor. Furthermore, there is observed merely a slight effect on lowering the gelation temperature in No. 5, because a small amount of molecules having low polymerization degree forms owing to addition of the chain transfer agent effected at a later time. In contradistinction thereof, the gelation temperature can effectively be lowered in Nos. 3–4 according to the present invention without lowering of the rate of polymerization and degrading the mechanical properties of the latex.

EXAMPLE 5

Polymerizations were effected according to the same prescription as in Example 4 except that the amounts of trichloroethylene added were changed. Average polymerization degree, average diameter of unit particles of vinyl chloride monomer. Temperature was elevated to the temperatures shown in Table 6 to initiate the polymerization. From the time when temperature reached the set temperature 0.0034 wt. percent based on the vinyl chloride monomer of hydrogen peroxide, and 1.0 equimolar based on the hydrogen peroxide of Rongalit were thereto added continuously throughout the polymerization time through separate inlets, respectively. Furthermore, from the time at which the conversion of the polymerization reached 13.5 wt. percent till completion of the polymerization, sodium dodecylsulfate as an emulsifier was thereto added continuously in a proportion of 0.02 wt. percent per hour based on the vinyl chloride monomer. After polymerization pressure dropped by 0.5 kg./cm.$^2$ less than that of the saturated vapor of the vinyl chloride at the polymerization temperature, the polymerization was suspended to recover unreacted monomer therefrom. Comparison of gelation temperatures of the polymers obtained by the above process with those of No. 2 and No. 3 of Example 5 was shown in Table 6.

TABLE 6

| No. | Polymerization temperature (° C.) | Conversion before addition of trichloroethylene (percent) | Amount of trichloroethylene added (wt. percent) | Average polymerization degree | Average diameter of unit particles (μ) | Gelation temperature (° C.) |
|---|---|---|---|---|---|---|
| 1* | 45 | 60 | 3 | 1,700 | 0.8 | 76 |
| 2* | 45 | 60 | 3 | 1,490 | 0.8 | 79 |
| 3 | 49 | | | 1,700 | 0.8 | 77 |
| 4 | 52 | | | 1,440 | 0.8 | 73 |

*In the above table, No. 1 and No. 2 are respectively the same as No. 2 and No. 3 in Table 5.

As is clear from Table 6, it is understood that No. 1 and No. 2 polymers according to the present invention have lower gelation temperatures than those of the polymers having the same polymerization degrees which have been obtained by an ordinary polymerization process in which the polymerization degree is controlled by changing polymerization temperature.

EXAMPLE 7

Polymerizations were carried out in the same manner as in Example 4 except that different chain transfer agents instead of trichloroethylene were used. Average polymerization degrees of the polymers thus obtained and gelation temperatures are shown in Table 7.

TABLE 7

| No. | Polymerization temperature (° C.) | Kind of chain transfer agent used | Conversion before add. tion of chain transfer agent (percent) | Amount of chain transfer agent (wt. percent) | Average polymerization degree | Gelation temperature (° C.) |
|---|---|---|---|---|---|---|
| 1 | 45 | Perchloroethylene | 60 | 3 | 1,750 | 76 |
| 2 | 45 | Carbon tetrachloride | 60 | 5 | 1,700 | 76 |
| 3 | 45 | Dodecyl mercaptan | 60 | 3 | 1,750 | 75 |

From Table 7, it is understood that similar effect can be obtained by known chain transfer agents.

We claimed:

1. A method for producing vinyl chloride polymer in the form of particles of 0.6–1.5μ in diameter having a composite structure in which the average polymerization degree of molecules of the unit particles lowers from their respective central portions towards the circumferential portions, and the average polymerization degree at the highest portion is 2,000–3,000, the average polymerization degree at the lowest portion is 500–1,500, and the difference between the polymerization degrees at the highest portion and at the lowest portion is 700–2,500, comprising emulsion-polymerizing vinyl chloride in the presence of water, water-soluble catalyst used in ordinary emulsion polymerization of vinyl chloride and emulsifier used in the ordinary emulsion polymerization of vinyl chloride, characterized in that (a) the polymerization is initiated at a temperature within a range of from 30° to 45° C., and when the conversion of polymerization is within a range of from 30 to 70%, the polymerization temperature is elevated by a temperature within a range of from 10° to 40° C. intermittently or continuously to a temperature of from 50° to 70° C., or (b) the polymerization is carried out at a temperature within a range of from 30° C. to 70° C. and when the conversion of polymerization is within a range of from 30 to 70%, a chain transfer agent is added to the polymerization system.

2. A method according to claim 1, wherein the water-soluble catalyst is hydrogen peroxide.

3. A method according to claim 1, wherein the emulsifier is sodium dodecylsulfate.

4. A method according to claim 1, wherein the polymerization temperature is elevated by 20° C.–40° C.

5. A method according to claim 1, wherein the chain transfer agent is trichloroethylene, perchloroethylene, tetrachloromethane or dodecyl mercaptan.

References Cited

UNITED STATES PATENTS

| 3,068,184 | 12/1962 | Noorduyn et al. | 260—23 |
| 3,189,587 | 6/1965 | Donat | 260—92.8 |
| 3,317,495 | 4/1967 | Jones et al. | 260—86.3 |
| 3,370,028 | 2/1968 | De Wald | 260—23 |
| 3,275,714 | 9/1966 | Thompson | 260—884 |
| 3,373,228 | 3/1968 | Glazer et al. | 260—884 |
| 3,401,838 | 9/1968 | Brady | 260—31.2 |
| 3,481,894 | 12/1969 | Lema et al. | 260—23.5 |

ALLAN LIEBERMAN, Primary Examiner

U.S. Cl. X.R.

260—34.2

UNITED STATES PATENT OFFICE
CERTIFICATE OF CORRECTION

Patent No. 3,652,525    Dated March 28, 1972

Inventor(s) Akihide Nakamura et al.

It is certified that error appears in the above-identified patent and that said Letters Patent are hereby corrected as shown below:

Please insert the following claim for priority:

--Japanese Appln. No. 39748/67 of June 20, 1967--

Signed and sealed this 5th day of December 1972.

(SEAL)
Attest:

EDWARD M. FLETCHER, JR.
Attesting Officer

ROBERT GOTTSCHALK
Commissioner of Patents